United States Patent Office 3,300,462
Patented Jan. 24, 1967

1

3,300,462
PROCESS FOR THE DEPOLYMERIZATION
OF STYRENE POLYMERS
Giuseppe Guzzetta, Milan, Franco Sabbioni, Castellanza, Varese, and Giovanni B. Gechele, Mestre, Venezia, Italy, assignors to Montecatini Edison S.p.A., Milan, Italy
No Drawing. Original application Jan. 29, 1958, Ser. No. 736,423, now Patent No. 3,143,536, dated Aug. 4, 1964. Divided and this application Sept. 27, 1963, Ser. No. 312,016
11 Claims. (Cl. 260—93.5)

This application is a division of copending U.S. patent application Serial No. 736,423, filed on January 29, 1958, now U.S. Patent 3,143,536.

This invention relates to a process for the controlled degradation of high molecular weight styrene polymers to polymers having a reduced molecular weight, and improved physical, mechanical and workability characteristics as compared to the higher molecular weight polymers.

It is known that styrene polymers having molecular weights in the millions are so hard and brittle that shaping is difficult and complicated unless the polymers are subjected to special treatments which alter the structure thereof by breaking the very long molecular chains. Such special treatments include pyrolysis and mastication, but neither is really effective when applied to polystyrene.

The depolymerization of polystyrene is, like the polymerization of monomeric styrene, a free radical process. During thermal treatment at high temperature, the free radicals formed from the broken chains tend to join up again or to produce, through a mechanism of chain transfer, branched and cross-linked chains. This tendency of the free radicals to join up or produce branched and cross-linked chains interferes with the depolymerization and either results in marked retardation of the depolymerizing process or stops the depolymerization altogether at equilibrium molecular weights which are too high for any practical application. The tendency of the free radicals to join up, or to produce branched and cross-linked chains, leads to undesirable modifications in the polystyrene as evidenced by the formation of insoluble masses.

In addition to having the foregoing disadvantages, pyrolysis, mastication and similar treatments require long treating times and present the problem that the results are not readily reproducible.

Somewhat improved results are obtained by degrading the high molecular weight polystyrene mechanically at room temperature, particularly in the suppression of chain transfer reactions which are not favored by heat as a source of activating energy during the mechanical working at room temperature. However, in order to obtain polystyrene having a practically useful molecular weight, it is necessary to masticate the initially high molecular weight polymer for a prolonged time or, at least, to operate with such low ratios of polymer free volume that the yield of depolymerized polymer per hour is still relatively low.

An object of the present invention is to provide a new and improved method for obtaining relatively low molecular weight polystyrene from relatively high molecular weight polymers.

Another object is to depolymerize high molecular weight polystyrene in a comparatively short time and with reliably reproducible results.

These and other objects are achieved by this invention which provides a method for effecting a rapid and controlled thermal degradation of the polystyrene by incorporating with the polymer, during the process, suitable amounts of substances which yield stable free radicals capable of combining with the polystyrene free radicals resulting from scission of the chains, and of forming with such radicals compounds which are inactive and do not join together or produce branches or cross-linked chains.

Compounds which we have found suitable for incorporation in the polymer to accomplish our objectives include antioxidants of the kind that stabilize polymers and elastomers (e.g. rubber) against the action of oxygen. Specific compounds which can be used in practicing this invention include:

(1) 2,2,4-trimethyl-1,2-dihydroquinoline
(2) 6-ethoxy-2,2,4-trimethyl-1,2,-dihydroquinoline
(3) 4,4'-thio-bis(3-methyl-6-tert. butyl phenol)
(4) 2,2'-methylene-bis(4-methyl-6-tert. butyl phenol)
(5) Hydroquinone-monobenzyl ether
(6) 2,5-di-tert. butylhydroquinone
(7) N,N'-diphenyl ethylene diamine
(8) p,p'-Methylene dianiline
(9) p-(p-Tolysulfonyl amide) diphenylamine
(10) Mixture of 4,4'-thio-bis(3-methyl-6-tert. butyl phenol and lauryl mercaptan We postulate that the substances listed and other antioxidants of that general type accelerate the depolymerization of the styrene polymers by preventing re-combination of the free radicals resulting from disruption of the polymer chains while, at the same time, also preventing the side reactions which result in branching and cross-linking and which are particularly detrimental because they reduce the crystallinity of the polymer obtained.

The antioxidants listed, when added to the polystyrene, serve to fix the small amounts of oxygen which can be bound to the macromolecules and which could hinder the reproducibility of the results obtained.

Other substances which we may use for attaining our objective of rapid, controlled thermal depolymerization of polystyrene are those substances which are generally known as initiators of free radical-type polymerizations or as chain transfer agents, e.g., azo compounds, mercaptans, etc. (see Emulsion Polymerization, Borey, Kathoff ed. 1955, chapter IV) and, in general, compounds which yield free radicals that can inactivate the polymer radicals by coupling of the two insulated electrons.

Controlled thermal degradation of polystyrene mixed with the additives does not present any difficulty in practice. The controlled thermal degradation can be carried out continuously or batchwise in reactors optionally provided with agitating means, such as ovens, extruders, mills, etc. The selection of the specific substance to be added to the polystyrene, the concentration thereof to be used, and the temperature at which the thermal degradation is effected, depend on the molecular weight of the starting polystyrene and the molecular weight desired for the degraded polymer.

In general, when only a small amount of the modifying agent is used (in general between 0.1% and 5% by weight) and the degradation is carried out at about 200° C. to 250° C., a reproducible and controlled degradation is obtained in a very short time.

Results similar to those obtained by the controlled thermal degradation can also be obtained by mechanical degradation of the polymer if it is carried out in the presence of the antioxidants, polymerization initiators or chain transfer agents. Although the depolymerization mechanism is the same in both cases, and the accelerating effect of the modifying agent is also exhibited in the mechanical degradations, the mechanical degradation requires a longer time to attain the result.

The process of this invention is particularly useful for the depolymerization of the isotactic polystyrene recently disclosed by Natta et al. The isotactic polystyrenes consist of polymers of very high molecular weight (in the millions) and have therefore, a low rate of crystallinity. A wide range of polymers having lower molecular weights and practically the same proportion of crystallinity as the starting polymer can be obtained quickly and economically from isotactic polystyrene, in accordance with the present invention.

The following examples are given to illustrate the invention, it being understood that these examples are not intended as limitative.

EXAMPLE 1

A portion of a powdered, substantially isotactic polystyrene having a molecular weight of about 1,340,000 was mixed with the substance as listed in Table I below, by impregnating the polystyrene powder with an acetone solution of the substance and then drying the mass at room temperature.

A 5 g. sample of the mixture was introduced into a glass tube which was evacuated and sealed. The tube was then introduced into an oven at 250±1° C. and kept there for 45 minutes. The results obtained are shown in Table I.

*Table I*

| Time Minutes | Substance added | Molecular Weight |
|---|---|---|
| 45 | | 1,340,000 |
| 45 | | 800,000 |
| | 4,4'-thiobis-(3-methyl-6-tert. butyl phenol), 0.2% | 90,000 |

The molecular weight was calculated from the intrinsic viscosity in tetrahydronaphthalene at 100° C. on the basis of the formula $$[\eta] = KM^a$$

where $[\eta]$ = intrinsic viscosity in 100 cc./g.
$K = 0.94 \times 10^{-4}$
$\alpha = 0.73$
$M$ = molecular weight

EXAMPLE 2

Portions of an isotactic polystyrene as in Example 1 were mixed with the substances shown in Table II, by the method of Example I. The mixtures were sintered in a press for 4 minutes at 90° C. The product, in the form of pieces, was then introduced into the apparatus for measuring flow rates of thermoplastics and determining the "melt index" (ASTMD1238–52T). After degradation in the apparatus at 250° C. for 30 minutes, the "melt index" was determined. As is known, this index depends on the molecular weight; the lower the molecular weight, the higher the melt index value. The value given in Table II is therefore an indication of the molecular weight of the starting polymer and of the degraded polymers.

*Table II*

| Substances added | Percent | "Melt Index" at 250° C. |
|---|---|---|
| | | About 0.1 |
| 4,4'-thiobis(3-methyl-6-tert. butyl phenol) | 1 | 39 |
| 4,4'-thiobis(3-methyl-6-tert. butylphenol)/lauryl mercaptan (mixture) | 0.5+0.5 | 24 |
| Lauryl mercaptan | 1 | 1.3 |
| p-(p-Tolyl-sulphonyl-amide) de-phenylamine | 1 | 1.2 |

EXAMPLE 3

Isotactic polystyrene as in Example 1 was mixed with 1% of 4,4'-thiobis(3-methyl-6-tert. butylphenol) and after sintering as in Example 2 the mixture was introduced into the apparatus for determining the melt index, a charge of 0.5 kg. being used.

The variation of the melt index at 250° C. depending on the time the mixture was kept in the apparatus is shown in Table III.

*Table III*

| Time, minutes: | Melt index at 250° C. |
|---|---|
| 0 | 0 |
| 15 | 0.9 |
| 45 | 1.8 |
| 75 | 29.0 |
| 105 | 31.7 |
| 135 | 33.0 |

When the amount of the antioxidant was varied, and the degradation time was 30 minutes at 250° C., the results shown in Table IV were obtained.

*Table IV*

| 4,4'-thiobis(3-methyl-6-tert. butyl phenol), percent: | Melt index |
|---|---|
| 0 | 0.1 |
| 0.2 | 5 |
| 0.5 | 31 |
| 1 | 39 |
| 2 | 98 |
| 4 | 110 |

The melt index was determined under the standard conditions of ASTMD1238–52T at 250° C.

EXAMPLE 4

Portions of the powdered substantially isotactic polystyrene were mixed with 0.5% of 4,4'-thiobis (3-methyl-6-tert. butylphenol) in a powder mixer. The mixture was fed into a screw-extruder having a diameter of 30 mm. and a length of 333 mm., and kept at an average temperature of 250° C. The mixture was held in the extruder for times varying between 5 and 10 minutes, and then extruded. The molecular weight of the extruded polymer is reported in Table V.

*Table V*

| Initial molec. weight | 4,4'-thiobis (3-methyl 6-tert. butylphenol) | R.p.m. | Final molecular weight |
|---|---|---|---|
| 1,340,000 | | 20 | 900,000 |
| 1,340,000 | 0.5 | 20 | 250,000 |
| 1,100,000 | 0.5 | 30 | 300,000 |

EXAMPLE 5

Portions of powdered substantially isotactic polystyrene as in Example 1 were mixed separately with the substances listed in Table VI, using the method of Example 1. The mixture was ground in a porcelain ball-mill at room temperature for 24 hours. The results of the mechanical degradation are given in Table VI.

*Table VI*

| Substances added | Percent | Molecular Weight |
|---|---|---|
| | | 1,340,000 |
| 2,2'-methylenebis(4-methyl-6 tert. butylphenol) | | 870,000 |
| | 2 | 450,000 |
| 4,4'-thiobis(3-methyl-6 tert. butylphenol) | 2 | 250,000 |

The method of the invention is generally useful in degrading polystyrenes of relatively high molecular weight to polymers of relatively low molecular weight. The starting polymers may have a molecular weight of, for instance, more than 1,000,000, and the depolymerization products may have molecular weights below 1,000,000 and as low as 50,000 or even lower, the extent of the depolymerization and consequently the molecular weight of the polymers obtained depending on the conditions used.

Since various changes and modifications may be made in practicing the invention without departing from the spirit thereof we intend to include in the scope of the appended claims all such modifications as may be apparent to those skilled in the art.

What is claimed is:

1. A process for depolymerizing isotactic polystyrene having a molecular weight in excess of 1,000,000 in a regular, non-random manner to obtain polystyrene having a desired molecular weight ranging from about 50,000 to 1,000,000 while substantially inhibiting the formation of branches and cross-linked chains, said process consisting essentially of mixing the polystyrene with approximately 0.1 to 5.0% by weight of at least one organic compound selected from the group consisting of:

2,2,4-trimethyl-1,2-dihydroquinoline,
6-ethoxy-2,2,4-trimethyl-1,2-dihydroquinoline,
2,2'-methylene-bis(4-methyl-6-tert. butyl phenol),
hydroquinone-monobenzyl ether,
2,5-di-tert. butylhydroquinone,
N,N'-diphenyl ethylene diamine,
p,p'-methylene dianiline, and
p-(p-tolylsulfonyl amide) diphenylamine and effecting the depolymerization by maintaining the mixture, in a substantially dry condition, at a temperature ranging from about 200° C. to approximately 250° C. until the desired depolymerization is obtained.

2. The process of claim 1 wherein the polystyrene being mixed with the organic compound is in the form of a powder.

3. The method of claim 1 wherein the organic compound is 2,2,4-trimethyl-1,2-dihydroquinoline.

4. The method of claim 1 wherein the organic compound is 6-ethoxy-2,2,4-trimethyl-1,2-dihydroquinoline.

5. The method of claim 1 wherein the organic compound is 2,2'-methylene-bis(4-methyl-6-tert. butyl phenol).

6. The method of claim 1 wherein the organic compound is hydroquinone-monobenzyl ether.

7. The method of claim 1 wherein the organic compound is 2,5-di-tert. butylhydroquinone.

8. The method of claim 1 wherein the organic compound is N,N'-diphenyl ethylene diamine.

9. The method of claim 1 wherein the organic compound is p,p'-methylene dianiline.

10. The method of claim 1 wherein the organic compound is p-(p-tolylsulfonyl amide) diphenylamine.

11. A process for depolymerizing isotactic polystyrene having a molecular weight in excess of 1,000,000 in a regular, non-random manner to obtain polystyrene having a desired molecular weight ranging from about 50,000 to 1,000,000 while substantially inhibiting the formation of branches and cross-linked chains, said process consisting essentially of mixing the polystyrene with approximately 0.1 to 5.0% by weight of at least one organic compound selected from the group consisting of:

2,2,4-trimethyl-1,2-dihydroquinoline,
6-ethoxy-2,2,4-trimethyl-1,2-dihydroquinoline,
2,2'-methylene-bis(4-methyl-6-tert. butyl phenol),
hydroquinone-monobenzyl ether
2,5-di-tert. butylhydroquinone,
N,N'-diphenyl ethylene diamine,
p,p'-methylene dianiline, and
p-(p-tolylsulfonyl amide) diphenylamine and effecting the depolymerization by grinding the mixture, in a substantially dry condition, at room temperature for 24 hours until the desired depolymerization is obtained.

References Cited by the Examiner

UNITED STATES PATENTS 3,143,536   8/1964   Guzzetta et al. _____ 260—93.5

JOSEPH L. SCHOFER, *Primary Examiner.*

J. A. SEIDLECK, *Assistant Examiner.*